United States Patent [19]

Williams et al.

[11] Patent Number: 5,448,592
[45] Date of Patent: Sep. 5, 1995

[54] CODED QAM SYSTEM

[75] Inventors: Richard G. C. Williams; John D. Brownlie, both of Suffolk, England

[73] Assignee: British Telecommunications public limited company, London, England

[21] Appl. No.: 30,232

[22] PCT Filed: Jul. 26, 1991

[86] PCT No.: PCT/GB91/01259
§ 371 Date: Mar. 22, 1993
§ 102(e) Date: Mar. 22, 1993

[87] PCT Pub. No.: WO92/02092
PCT Pub. Date: Feb. 6, 1992

[30] Foreign Application Priority Data

Jul. 26, 1990 [GB] United Kingdom ............... 9016420

[51] Int. Cl.⁶ .................... H04L 5/12; H04L 23/02
[52] U.S. Cl. .................... 375/263; 371/37.1; 371/37.2; 371/37.7; 371/46; 375/295; 375/340; 375/354
[58] Field of Search ............ 375/39, 25, 59, 106, 375/112; 371/37.1, 37.5, 37.7, 43, 47.1, 37.2

[56] References Cited

U.S. PATENT DOCUMENTS

| | | | |
|---|---|---|---|
| 3,955,141 | 5/1976 | Lyon et al. | 325/38 A |
| 4,586,182 | 4/1986 | Gallager | 375/39 |
| 4,597,090 | 6/1986 | Forney, Jr. | 375/39 |
| 4,683,578 | 7/1987 | Betts et al. | 375/39 |
| 4,899,367 | 2/1990 | Sampei | 375/39 |

FOREIGN PATENT DOCUMENTS 0229923 11/1985 European Pat. Off.
0282298 9/1988 European Pat. Off.
0392723 10/1990 European Pat. Off.
0406507 1/1991 European Pat. Off.

OTHER PUBLICATIONS

Forney, Jr., "Multidimensional Constellations—Part I: Introduction, Figures of Merit, and Generalized Cross Constellations", IEEE Jornal on Selected Areas in Communications, vol. SAC-7, No. 6, Aug. 1989, New York, pp. 877–892.

CCITT Study Group Papers, "Constellation and Symbol Mapping", D133, pp. 1–7, Genova, 29 Oct.–6 Nov. 1991.

CCITT Study Group Papers, "Additional Details on AT&T's Candidate Modem for V.fast", D 157, pp. 1–6, 29 Oct.–6 Nov. 1991.

PCT International Search Report, European Patent Office, completed Oct. 24, 1991.

Primary Examiner—Stephen Chin
Assistant Examiner—Amanda T. Le
Attorney, Agent, or Firm—Nixon & Vanderhye

[57] ABSTRACT

A block of output symbols is generated, using quadrature amplitude modulation, from a block of input bits. The input bits are processed, using one or more redundant codes having a Hamming distance greater than one, to produce digital words which control the in-phase components and digital words which control the quadrature components of the output symbols. A group of bits generated by a single coding step supplies bits for both types of digital word, thereby enabling that coding step to process simultaneously a larger number of bits than would be the case if separate coding were used for producing the two types of word.

15 Claims, 10 Drawing Sheets

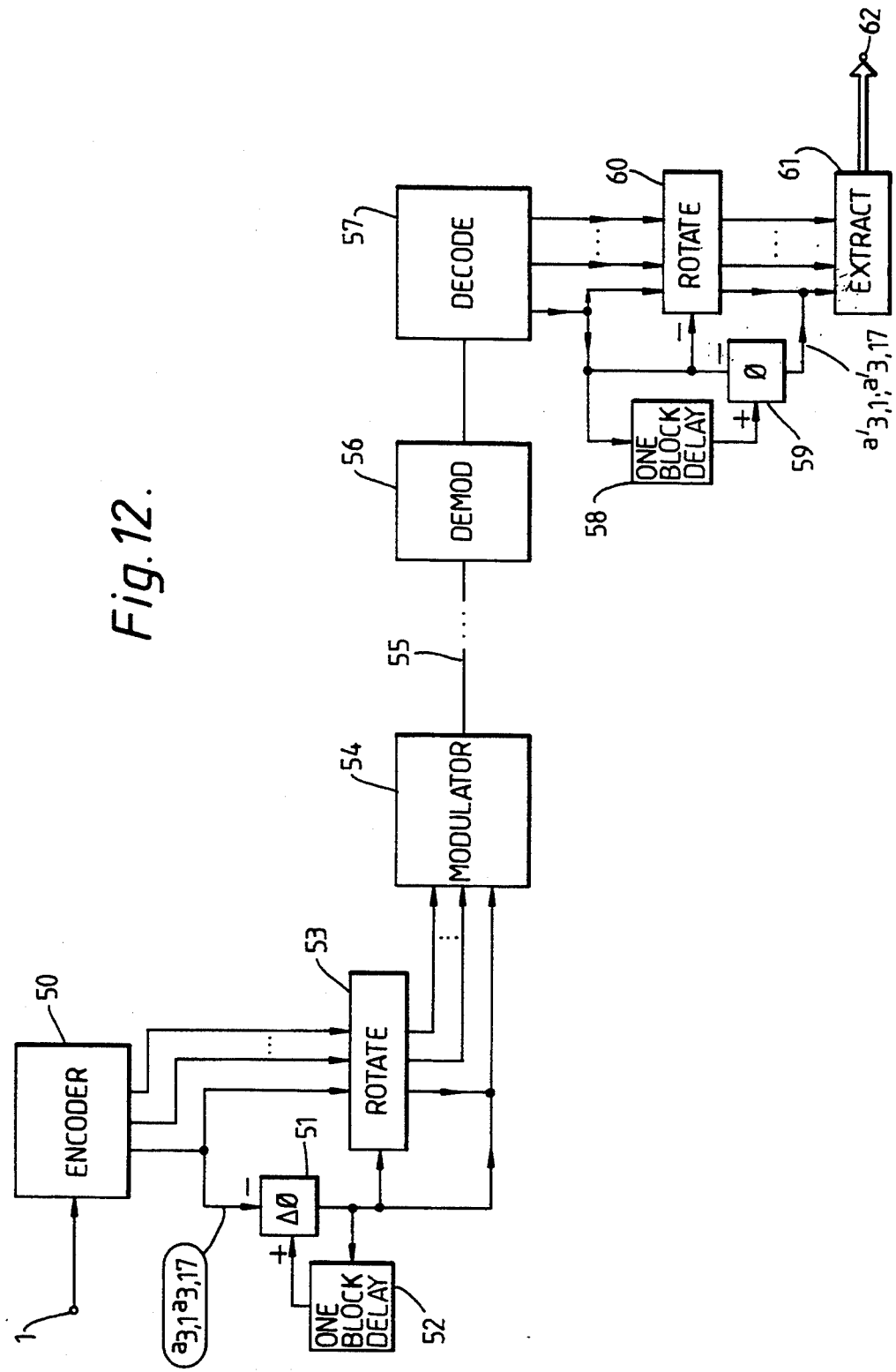

CODED QAM SYSTEM

RELATED APPLICATIONS

This application is related to commonly assigned U.S. patent application Ser. No. 08/122,525 filed Dec. 1, 1993 entitled FRAME SYNCHRONISATION FOR QAM and naming John D. Brownlie and Richard G. Williams as inventors.

FIELD OF THE INVENTION

The present invention relates to phase amplitude modulation particularly, though not exclusively, using block coding.

BACKGROUND OF THE INVENTION

In digital phase amplitude modulation, the modulated signal consists of a sequence of symbols in each of which a carrier has a selected phase and amplitude. Only certain phase/amplitude combinations are permitted; these combinations may be plotted on a diagram with in-phase and quadrature axes to form a pattern; the set of allowable points in this pattern is commonly referred to as a constellation. If for example, one has a 16 point constellation, it is a simple matter to modulate the signal with a 4-bit word to be transmitted by regarding each point as associated with a respective one of the 16 possible combinations of four bits.

It has been shown however that by using a larger constellation (e.g. 32 points) and a suitable coding of the 4 bits, the resultant inherent redundancy in the modulated symbol sequence can be exploited by a soft decision decoder to improve the reliability of decoding in the presence of noise to an extent which exceeds the degradation caused by the larger numbers of points and results in a net coding gain. Coding gain is defined as the difference (in dB) between the signal-to-noise ratio that a coded scheme needs to operate at a particular error rate and that needed by the equivalent uncoded system.

One method of achieving coding gain is by the use of convolutional coding; here however we are concerned primarily with block coding, though the synchronization arrangements to be described are not limited to such cases.

It is inherent in block coding that output symbols are generated on a block by block basis. Thus if a 16-point constellation is to be used for modulation at a rate of 3 bits/symbol, then the coding process needs to produce 4n bits (for selecting points in the constellation) for every 3n data bits received (where n is the length of a block of symbols).

Consider now the concept of set partitioning: the signal constellation is progressively partitioned into subsets having increasing minimum Euclidean distance between the points of each subset; $\Delta_0 < \Delta_1 < \Delta_2 \ldots$ as illustrated in FIG. 1 for 16 point quadrature amplitude modulation. The Euclidean distance is simply the linear distance on the phase diagram between adjacent points of a subset; thus, assuming the sixteen points are on a unit grid, $$\Delta_0 = 1 \qquad \Delta_0^2 = 1$$
$$\Delta_1 = \sqrt{2} \qquad \Delta_1^2 = 2$$
$$\Delta_2 = 2 \qquad \Delta_2^2 = 4$$
$$\Delta_3 = 2\sqrt{2} \qquad \Delta_3^2 = 8$$

This distance is significant in that it is a measure of the capability of a hard decision decoder to discriminate between points in the subset in the presence of noise. By labelling each partition with a binary digit as shown we form a partition tree. In FIG. 1 the label for each point is constructed from the bits labelling the partitions needed to reach it; it is convenient to write the bit corresponding to the first partition level as the rightmost bit of the point label and so on. We then see that points whose labels first differ (when read from right to left) in the ith position (where the rightmost bit is the first position) are a Euclidean distance of at least $\Delta_{i-1}$ apart.

The concept of set partitioning in this manner is discussed in G. Ungerboeck's paper "Channel coding with multilevel/phase signals", IEEE Trans IT-28, pp 55–67, January 1982.

The other primary consideration in the coding process is the Hamming distance of the code or codes employed. FIG. 2 illustrates the coding process, in the form of an array. Of a total of $\Sigma k_i$ input bits, $k_1$ bits are coded by means of an (N, $k_1$, $d_1$) code to form a first row of bits $a_{11} \ldots a_{1N}$, $k_2$ bits are coded by means of an (N, $k_2$, $d_2$) code to form the second row of bits $a_{21} \ldots a_{2N}$, and so on. The array has N columns, the bits of each column forming a point label $L_1 \ldots L_N$.

An (n, k, d) code is one in which k input bits are coded into n bits, with a minimum Hamming distance of d.

For the 16 point constellation of FIG. 1 one might choose codes as set out below, with a block size of 8 symbols.

| i | code | Euclidean Distance | $d_i\Delta^2_{i-1}$ |
|---|------|-------------------|---------------------|
| 1 | (8, 1, 8) | 1 | 8 |
| 2 | (8, 4, 4) | 2 | 8 |
| 3 | (8, 7, 2) | 4 | 8 |
| 4 | (8, 8, 1) | 8 | 8 |

Total number of input bits = $\Sigma k_i$ = 20.

The square Euclidean distance $\Delta^2_{i-1}$ increases down the column, with the Hamming distance d decreasing down the column. The minimum value of the product $d_i \Delta^2_{i-1}$ is preferably large for good performance. Note that although the fourth row is actually uncoded—i.e. the 8 bits are simply 8 of the input bits unaltered, it is convenient to view this as an (n, n, 1) "code".

The codeword array concept is described in Imai & Hirakawa's paper "A new multilevel coding method using error-correcting codes", IEEE Trans IT-23, pp 371–377, May 1977, and in relation to Reed-Muller codes by E. Cusack, "Error control codes for QAM signalling", Elec. Letts., 20, pp 62–63, Jan. 19th 1984.

It is worth noting at this point that the labelling of bits in FIG. 1 is entirely systematic. Although in most cases this is the most convenient way of proceeding, it is not essential in all cases. In particular, if two rows of the array are coded with codes having the same Hamming distance (or are uncoded) then the lower of these two rows can be allowed a larger Euclidean distance without reducing the coding gain, and therefore the meaning of the two bits from these rows for any one or more symbols can be transposed with no effect, for example, if the bottom two rows are uncoded, then the allocation of the corresponding label bits to the signal points of the constellation can be entirely arbitrary (although this allocation may be subject to other constraints; e.g. for the purpose of achieving 90° phase jump immunity, as will be discussed below). A departure from structured partitioning which results in a reduction of the minimum $d_i\Delta^2_{i-1}$ product will produce a degradation of performance but may still provide a performance better than that of the uncoded case. Indeed, random labelling does not necessarily preclude some coding gain, but for good results then, if we define the Euclidean significance of a label bit as being the smallest change of Euclidean distance that changing that bit can produce, it is preferable that the label bits do not all have the same Euclidean significance. In the following description, the term "significance" is used to mean Euclidean significance as defined above, and labels are written with the significances of the bits increasing from right to left (analogously to the conventional representation of binary numbers). This convention can give rise to ambiguity in that two bits of a given label can have the same significance, but no confusion arises since in this situation it generally does not matter which bit is which.

A modification to this method has been proposed by RGC Williams and PG Farrell in "Combined Coding and Modulation with decreased decoding Complexity", IEEE ISIT '88, Kobe, Japan, June 1988. They regarded the modulated signal as being the sum of two amplitude modulated signals in phase-quadrature and coded separately in the two dimensions. Thus the two-dimensional constellation was regarded as two one-dimensional constellations transmitted in quadrature. It follows that the set partitioning process discussed with reference to FIG. 1 is carried out in the two dimensions separately. This is shown in FIG. 2A for the x dimension. Note that the labels actually correspond to the x coordinate as measured from the leftmost point; if different senses are chosen for the 0/1 division at any partition this simply results in one or more bits of the label being inverted relative to the coordinate bit.

Coding is illustrated in FIG. 3 for the general case. Here the as and bs are elements of codes as before. Now each dimension has its own codeword array, producing labels $L_{x1}, \ldots L_{xN}; L_{y1} \ldots L_{yN}$. In principle different codes could be used in each dimension's array if quadrant phase immunity is not required.

FIG. 4 shows a specific example of such a scheme assuming we wish to send 3 bits/symbol over a 16-point QAM signal constellation, with a block size of N=8. We require two bits per symbol in each dimension (=four bits/symbol); for a block we generate 4N=32 bits from m=24 input bits (i.e. the rate of the code is 24/32=¾). The 24 input bits are divided into two groups of 12 (note that these schemes take no cognizance of the meaning of the input bits and it is immaterial whether the 24 bits are eight 3-bit words or three 8-bit words; thus the division into two groups is arbitrary). Of each group of 12 bits, four are coded into the 8 bits of the first row of the relevant array using the (8, 4, 4) Reed-Muller code, and the remaining 8 pass unmodified into the second row. Assuming the FIG. 2A partioning, each column forms the x or y coordinate of a symbol to be transmitted.

Again, the top row forms the least significant bit.

A 16-point constellation is shown in FIG. 5 with labels derived from the FIG. 2A partitioning. The method employed for decoding this array involves decoding separately in the two dimensions. Imagine that a demodulator has received the eight points (relative to the lower left point of the constellation) of a block and the x-coordinates of the received points are (1.02, 2.94, 0.23, 2.53, 3.23, 0.45, 2.03, 1.24)

The first step is to regenerate the first row of the coding matrix; these bits indicate whether the coordinate is odd or even; thus the received vector is converted into a vector with values between 0 and 1 indicating the distance of the received x-coordinate from the nearest even number, viz (0.98, 0.94, 0.23, 0.53, 1.0, 0.45, 0.03, 0.76)

Note that 3.23 is given the value 1.0 since the largest even coordinate in the constellation is 2.

Application of a soft-decision decoding algorithm gives information digits 1010, implying a transmitted top row codeword of 11001100. This type of soft-decision decoding is well known; however for a more detailed description in relation to decoding in the separate dimensions see R. G. C. Williams, "Low Complexity Block Coded Modulation", Ph.D. Thesis, Victoria University of Manchester, U.K., August 1988.

Knowing the least significant bit of each symbol (i.e. whether the symbol is even (0) or odd (1)) an inspection of the received coordinates shows that the transmitted vector is (1, 3, 0, 2, 3, 1, 2, 2) and the remaining eight information bits are (0, 1, 0, 1, 1, 0, 1, 1). Clearly if more than two rows were involved, then the algorithm could be applied progressively; in a more sophisticated system the results of later decisions could be fed back to modify earlier decisions (again discussed by Williams).

Note that if the same codes are chosen for each dimension's array then there are fewer different decoders required for the decoding since each array has only half the number of rows of the equivalent 2 dimensional array. Another feature of this scheme is that the decoders work with 1-dimensional distances and are therefore not as complex as the decoders used in the original scheme which worked with 2-dimensional distances due to the nature of the signal constellations.

SUMMARY OF THE INVENTION

According to one aspect of the present invention there is provided an apparatus for modulating digital signals onto a carrier, comprising:
 means for receiving a block of bits to be transmitted;
 coding and partition means for partitioning each block into groups of bits, at least one group having been coded by a redundant code having a Hamming distance greater than one, the partitioning and coding being such that each group has the same number of bits;
 means for assembling a plurality of digital words from the bits of the said groups;
 means for quadrature amplitude modulation of a carrier to form a plurality of successive output symbols, the two quadrature components of each symbol being determined by a respective pair of the digital words;

characterized in that each word contains a bit from each group, whereby the or a single redundant code produces bits which control both quadrature components of each symbol.

Preferably in the coding and partitioning means at least one other group is either uncoded or is coded using a code having a smaller Hamming distance than the said one group, and the modulation means is so arranged that each bit supplied thereto as part of the pair of digital words which is derived from the said other group produces a minimum Euclidean distance which is greater than that produced by any bit derived from the said one group. In particular it is preferred that at least one coded group is coded employing a code which has a Hamming distance greater than that obtainable by dividing the group into two subgroups and coding each subgroup independently into the same total number of bits.

If desired, for improving resistance to 90° phase jumps, the apparatus may include means to examine bits determining a predetermined symbol of a block and those of a predetermined symbol of the preceding block to determine the angular difference between the quadrants occupied by those symbols; means for rotating the phase of the transmitted symbols of the block in question by the said angular difference, and means for modulating the carrier with information representing the angular difference.

In another aspect the invention provides a modulation apparatus comprising quadrature amplitude modulation means operable in a first mode to produce one of a plurality of discrete output symbols each having a predetermined phase and amplitude and operable in a second mode to produce one of a second such plurality of discrete output symbols each of which has at least one quadrature component with an amplitude greater than that of the corresponding component of any of the first plurality of symbols, means for supplying to the quadrature amplitude modulation means digital words for selecting of output symbols, and block timing means operable to produce a block synchronization signal during a predetermined symbol period of a block of symbols, the quadrature amplitude modulation means being responsive to receipt of the synchronization signal to operate in the said second mode for production of a symbol during that period.

BRIEF DESCRIPTION OF THE DRAWINGS

Other preferred features of the invention are set out in the subclaims.

Some embodiments of the invention will now be described, by way of example, with reference to the accompanying drawings, in which:

FIG. 12 is a block diagram of a modified form of coder and decoder;

FIG. 13 and 14 are phase diagrams showing enlarged constellations employed in a further modification of the invention;

DETAILED DESCRIPTION OF THE DRAWINGS

The proposed modulation scheme uses only one array of 1-dimensional components, the output information being shared between the two QAM signal coordinates.

Figure 4:
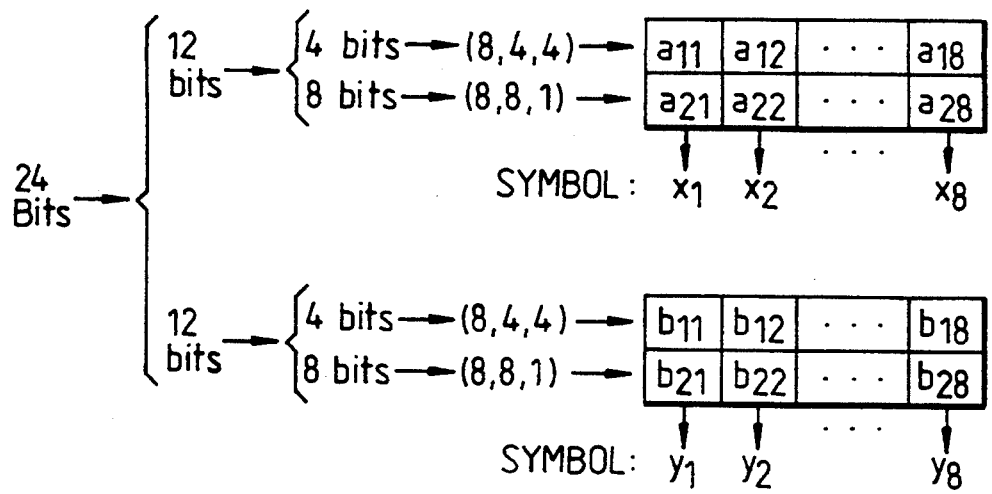
FIG. 4 is an array illustrating a specific example of the array of FIG. 3.
Figure 5:
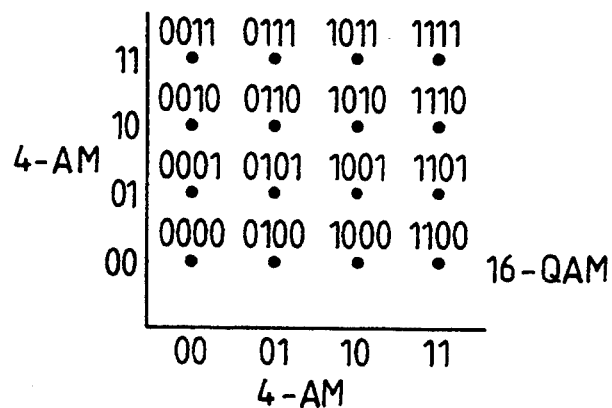
FIG. 5 is a phase diagram showing the labelling of the points of a 16 point QAM constellation as used in a first embodiment of the present invention.
Figure 6:
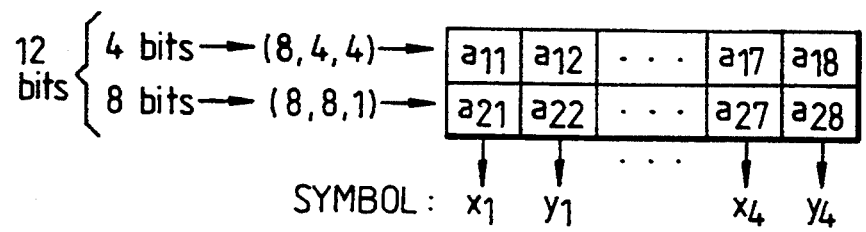
FIG. 6 is an array illustrating the operation of the first embodiment of the invention.

FIG. 6 shows an arrangement which is essentially FIG. 4 cut in half. Although the number of columns in the array is still 8, the block size is now 4 since two columns are required for the x and y coordinates of one symbol. Thus the number of bits transmitted per symbol, and the coding gain, are unchanged, but the block size is halved.

Figure 7:
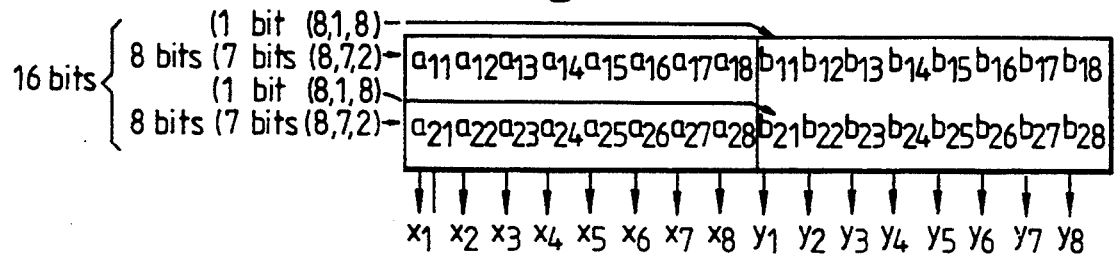
FIG. 7 is the known array of FIG. 4, redrawn for comparison purposes.
Figure 8:
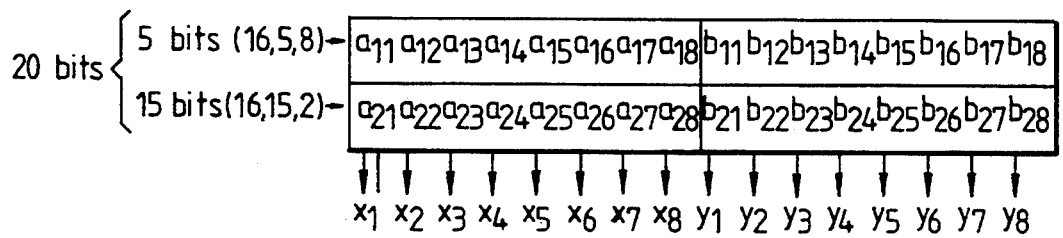
FIG. 8 is an array illustrating a second embodiment of the invention.

It is important to appreciate the fundamental difference between this scheme and the earlier one-dimensional scheme, and that this appreciation is not obscured by any particular way of drawing the diagrams used to represent the schemes. Referring to FIGS. 7 and 8, FIG. 7 shows a scheme similar to that shown in FIG. 4, (with eight symbols per block) but with a rate of ½, thus accommodating only 16 input bits per block. FIG. 8 shows a conjectural scheme as envisaged by the present invention, also with a block size of 8.

Again we have to generate a total of 32 bits (16 in each row). If we conjecture that, of 16 input bits, we code 2 bits into the first row with a (16, 2, 8) code and fourteen in the second row using a (16, 14, 2) code then we have achieved no advantage. However, a (16, 5, 8) code and a (16, 15, 2) code both exist (Reed-Muller codes) and if (as shown in FIG. 8) we employ these then although the block size and coding gain are unchanged, the scheme has an enhanced transmission capacity of 20 rather than 16 bits.

It may be noted that this example has the same performance as the conventional 20-bit scheme discussed in the introduction; however it has the advantage of reduced complexity of coding.

It is a known property of redundant codes that the maximum Hamming distance d obtainable, for a code of a given rate, increases with the length of the code. The invention thus exploits this fact by, for at least one array row, coding the bits controlling the x and y coordinates of the constellation symbols together using a single code.

The advantage of this is that one or more of the following (for a given signal constellation) can be enhanced compared with using entirely separate coding of the two dimensions (a) the block size
(b) the coding rate (i.e. no. of bits/symbol)
(c) the coding gain.

Improvement (a) is exemplified by the comparison between FIGS. 4 and 6, whilst that of (b) can be seen from FIGS. 7 and 8.

To illustrate meaningfully an improvement in coding gain by such a direct comparison is more difficult since for a given coding scheme in accordance with the invention this involves visualising an equivalent decoupled-coding scheme having the same rate and block size. An improvement in coding gain necessarily involves an improvement in the Hamming distance $d_i$ for all rows having a minimum $d_i \Delta_i^2{}_{-1}$ product, so that for any scheme having such a row with $d_i = 1$ a directly equivalent decoupled scheme does not exist since this would need a Hamming distance of $\frac{1}{2}$.

A more practical scheme, using a larger block size, will now be described, together with particulars of its implementation. The scheme is set out in FIG. 9, in the same manner as before.

This codes 4 bits/symbol onto a 64 point constellation, using a block size of 16; the coding rate is $\frac{2}{3}$. The first array row uses the (32, 6, 16) Reed-Muller code, the (32, 26, 4) extended Hamming code and an uncoded (32, 32, 1) row.

Figures 13, 14:
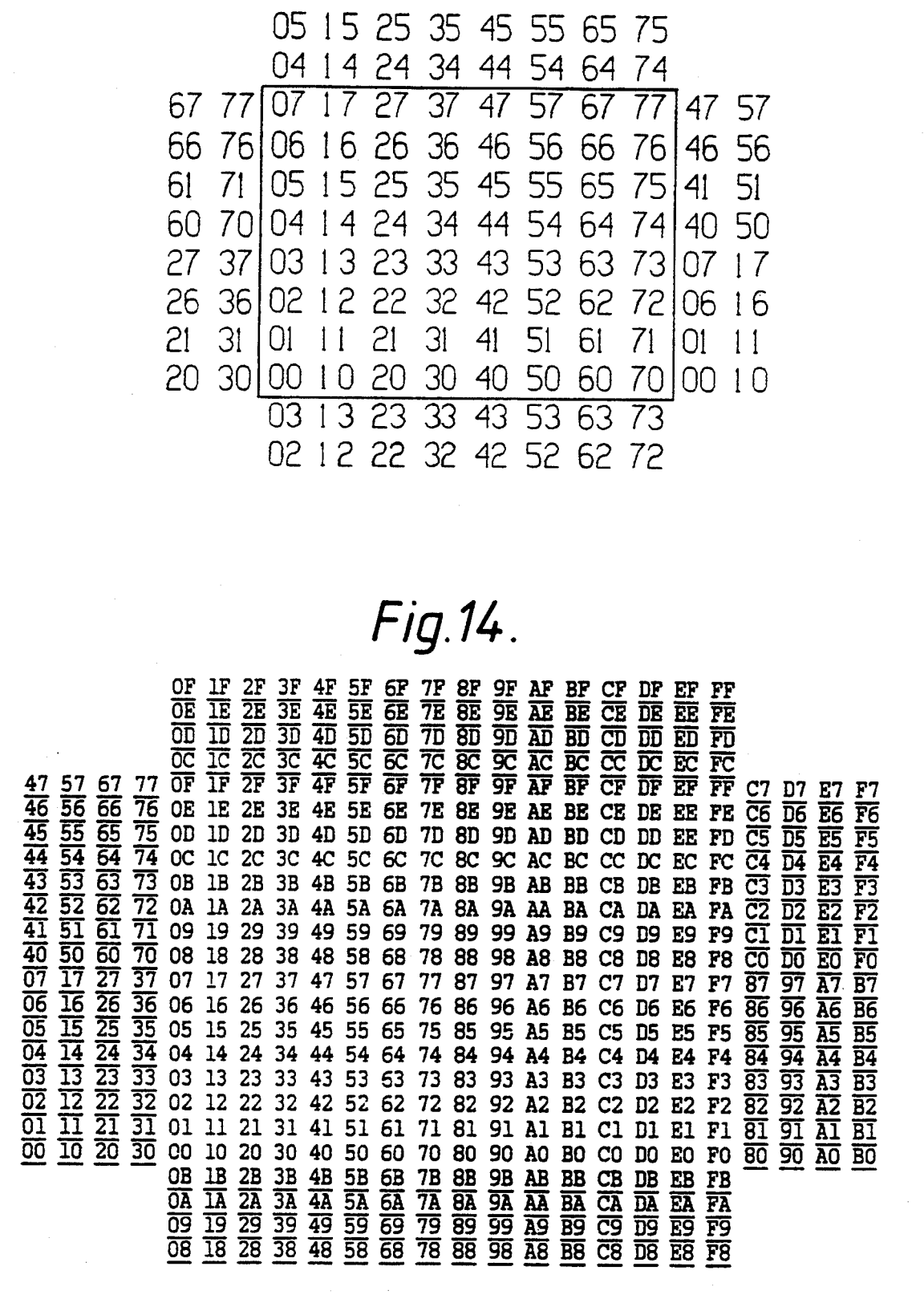

A suitable constellation is shown as the centre portion of FIG. 13, where point labels (which are the same as the x, y coordinates) are indicated in octal notation. The outer (underlined) 64 points will be discussed later. A block diagram of a coder for implementing this scheme is shown in FIG. 10. An input 1 is assumed to receive serial data at 9.6 k bit/s which is clocked into a 64-bit serial in parallel-out shift register 2 under control of a 9.6 kHz clock signal $\phi_1$ from a master clock generator 3 synchronized (by means not shown) to the input bit stream. Every 64 bits, the parallel output is loaded by means of a second clock signal (at $9600/64 = 150$ Hz) into a register 4. Of the 64 bits in this register, 6 bits are fed to a coder 5 which implements the (32, 6, 16) Reed-Muller code and produces 32 bits $a_{1,j}$ whilst 26 bits are supplied to a coder 6 which implements the (32, 26, 4) extended Hamming code and produces 32 bits $a_{2,j}$. The remaining 32 bits are uncoded and form the 32 bits $a_{3,j}$ shown in FIG. 9. As mentioned previously the allocation of which bits go to which coder is arbitrary.

The 96 bits $a_{1,j}$, $a_{2,j}$, $a_{3,j}$ are now supplied to six 16-stage shift registers 7–12. The registers 7, 8 and 9 are to contain the x coordinates of the output symbols and the registers 11, 12 and 13 the y coordinates. Sixteen of the heavily coded bits $a_{1,j}$ from the coder 5 are loaded in parallel into the shift register 7 and the other 16 into the register 10. Similarly the less heavily coded bits $a_{2,j}$ from the coder 6 are loaded into the registers 8 and 11, sixteen into each, and the uncoded bits $a_{3,j}$ are equally divided between the registers 9 and 12. The loading occurs under control of a 150 Hz clock signal $\phi_2'$ delayed with respect to the signal $\phi_2$ to allow for delays in the coders 5, 6.

The six registers 7–12 now contain the x and y coordinates of sixteen symbols to be transmitted; once loaded their contents are clocked out under control of a 2.4 kHz clock $\phi_3$ (i.e. at a baud rate of 2400). Thus, every symbol period, a three-bit word representing the x coordinate of the symbol to be transmitted is available at the output of the registers 7, 8, 9 where register 9 supplies the most significant bit and register 7 the least. Similarly the y coordinate is available at the output of the registers 10, 11 and 12.

These outputs are used to control modulation of a carrier; this process is illustrated in the diagram by a pair of amplitude modulators 13, 14 supplied respectively with carrier $C_I$ and carrier $C_Q$ in phase quadrature to it, whose outputs are added in an adder 15 to provide a modulated output at an output 16. Although not shown, any of the usual techniques conventionally employed for avoiding phase or slope discontinuities in the modulated signal may be employed. Note that although coordinates here are expressed relative to the bottom left point of the constellation, a symmetrical representation is more usual. This simply represents a translation of $(-3.5, -3.5)$ which is assumed to occur in the modulators 13, 14.

Figure 9:
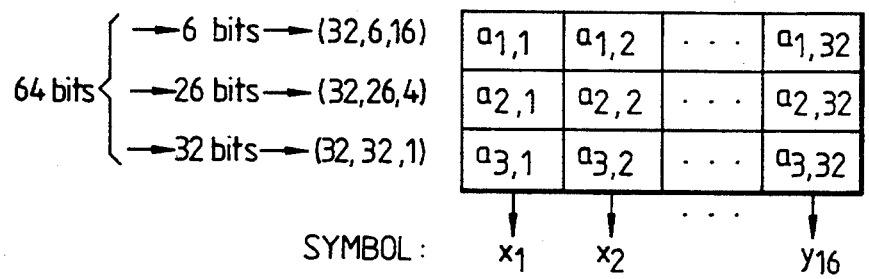
FIG. 9 is an array illustrating a third embodiment of the present invention.
Figure 10:
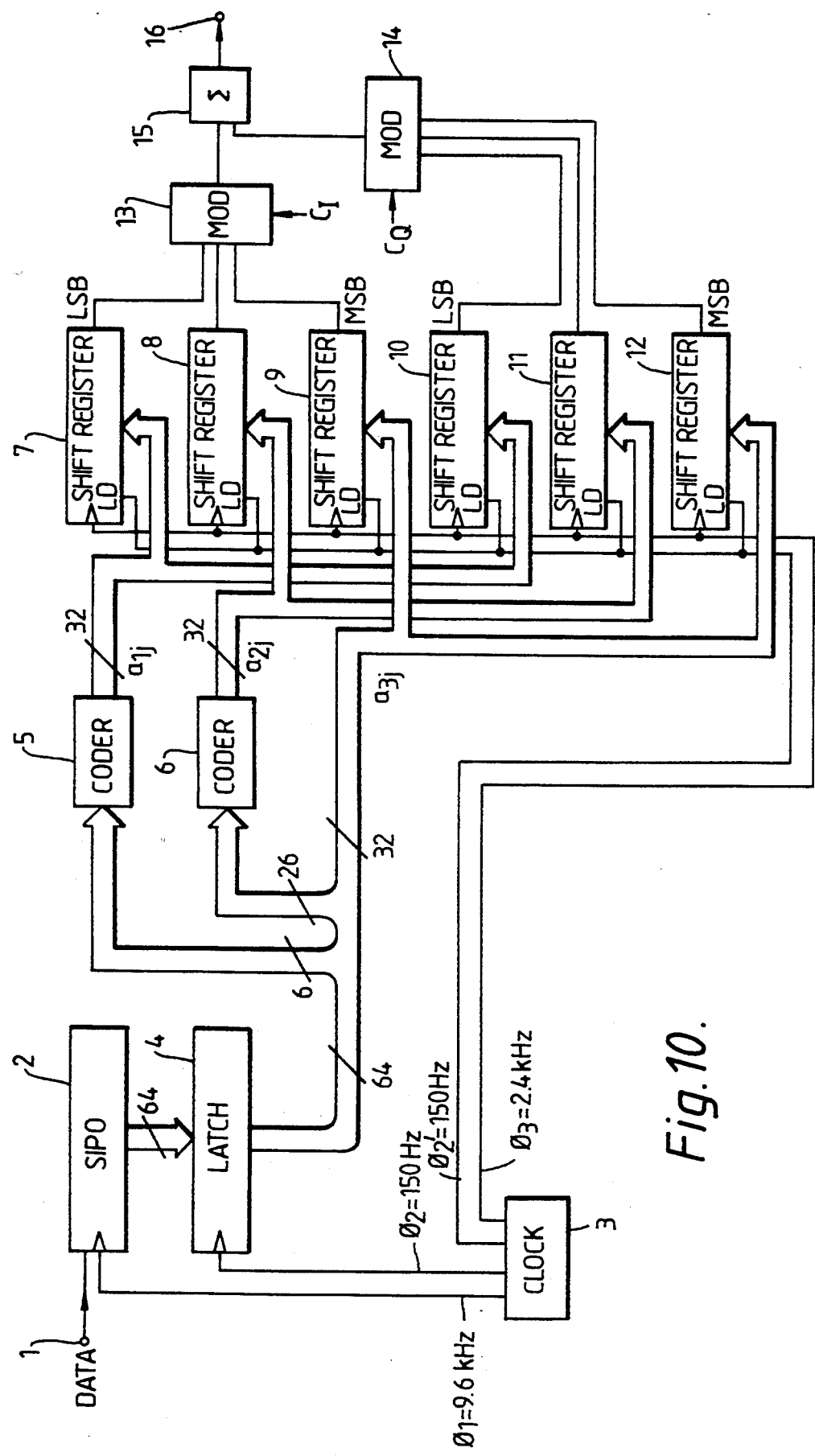
FIG. 10 is a block diagram of a coder operating in accordance with the array of FIG. 9.

Another scheme similar to that shown in FIG. 9 uses the following codes.

(32, 16, 8) Reed-Muller for $a_{1,j}$ (32, 31, 2) Parity Check for $a_{2,j}$ (32, 32, 1) Uncoded for $a_{3,j}$ This has an inferior noise immunity to that of FIG. 8 but has a higher coding rate of 79/96, i.e. it carries an extra 15/16 bit/symbol. If a fourth, uncoded, row is added and a 256 point signal constellation (e.g. as shown in the inner portion of FIG. 14) is used, then it can carry 111 bits/block, i.e. $6\,15/16$ bits/symbol. If provision is made (as described below) for carrying one extra bit per block, a bit rate of 19.2 kbit/s at 2743 baud can be achieved.

Note that the scheme described apparently requires an even length for the codeword array, so that the columns of the matrix can be divided equally between the two coordinate axes. However, if an odd length q is desired this can be accommodated. One method of coping with this would be to carry over one coordinate of alternate blocks to the next block, so that alternate transmitted blocks contain $(q-1)/2$ and $(q+1)/2$ symbols respectively.

Decoding of these signals is carried out in a manner analogous to that described in the introduction for entirely separate decoding on the two dimensions, the essential difference being of course that the x and y coordinates obtained from the demodulator are assembled into a single vector (in the same sequence, naturally as at the transmitter) and processed together.

Figure 11:
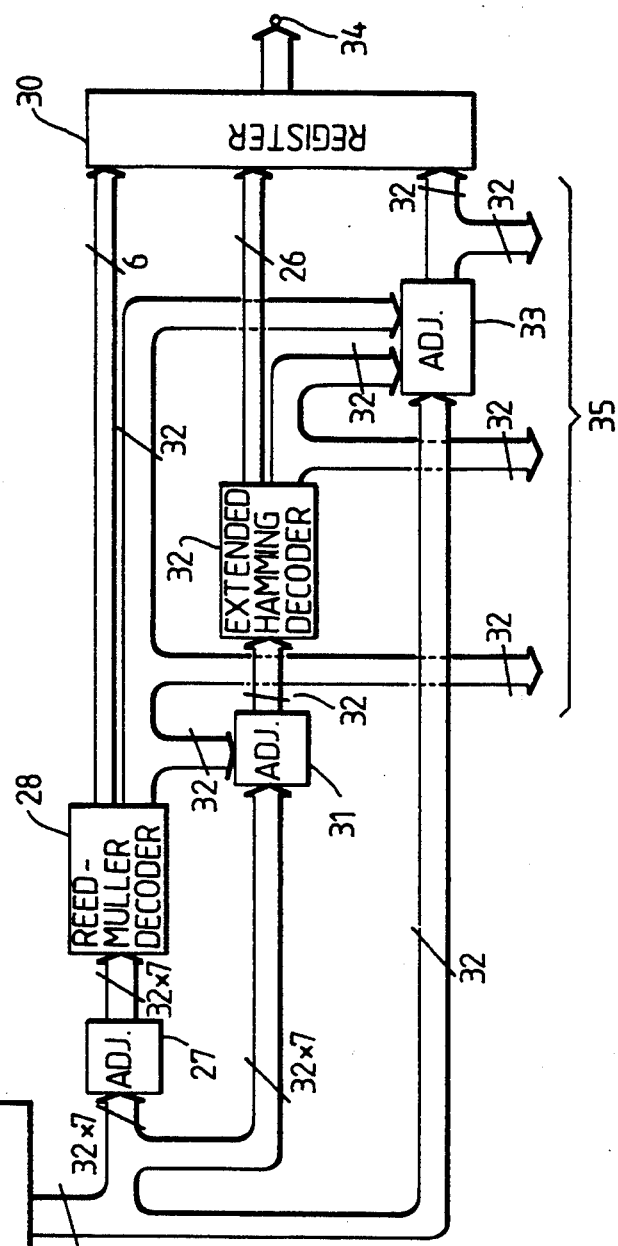
FIG. 11 is a block diagram of a corresponding decoder.

A block diagram of a decoder for the code of FIG. 9 is shown in FIG. 11. A demodulator 20 receives the incoming signal and includes carrier synchronization recovery and symbol synchronization; it demodulates the signal to obtain x and y coordinates in digital form. Assuming, as is conventional, that these coordinates are relative to the point of symmetry of the constellation, adders 21, 22 add 3.5 to each coordinate to produce the x, y coordinates relative to the lower left hand corner of the constellation. As shown, the outputs of the adders are to 8-bit accuracy (3 bits before the binary point, since the maximum coordinate is 7). The demodulator also produces symbol clock signals $\phi_s$.

The output coordinates are clocked into 16 state (16 being the block size) shift registers 24, 25 under control of the symbol clock $\phi_s$ and, each block period, loaded in parallel under control of a block synchronization signal $\phi_B$ into a 32×8 bit buffer 26. The least significant seven bits of each word pass via a unit 27 which derives the distance of each coordinate from the nearest even number in the range 0 to 6 and supplies these to a soft decision decoder 28 for the (32, 6, 16) Reed-Muller Code. The output of this decoder is 6 data bits and the valid 32-bit word which the decoder has judged the transmitter to have used in the first row of the array.

The former are supplied to an output register 30, the latter to a unit 31 which adjusts the values of (the least significant seven bits of) the next 32 coordinates from the register 26 (i.e. constrains them to be the nearest odd or even number according to the output of the decoder 28), prior to passage to a soft decision decoder 32 for the (32, 26, 4) extended Hamming code. This decoder supplies a further 26 data bits to the output register 30. The decoder 32 also has an output for the 32 bits which it has judged the transmitter to have sent; these are supplied, along with the corresponding bits from the decoder 28, to a unit 33 which makes any necessary adjustment to the remaining 32 (most significant) bits from the register 26. As these bits are uncoded they then pass directly to the output register 30. The total of 64 bits from the register 30 are forwarded to the receiver's output 34. The 32-bit outputs from the decoders 28, 32 are also conducted to an auxiliary output 35 along with the adjusted uncoded bits from the unit 33.

When using signal constellations that contain rotational symmetries there is a danger that they may suffer an undetected phase shift. If, during transmission, there is something on the channel that rotates the constellation points through one of its angles of symmetry then the receiver's carrier tracking circuits will be fooled. The receiver will think that it is receiving perfectly good points and will produce data but this data will be based on the labels of the wrong points. For example, if a QAM signal constellation is rotated through 90° during transmission then the receiver will produce data based on the labels of points in the quadrant adjacent to those that the transmitted data had selected. If we are not careful the data that we output will be wrong. It is clearly necessary to take action to prevent catastrophic error propagation. The problem has traditionally been overcome in the convolutionally encoded case by using the process of differentially encoding the data first.

In the case of block codes, it has been proposed by Brownlie and Williams to apply a differential coding between blocks. A quadrant rotation is determined by comparing the quadrant bits (i.e. the most significant x bit and the most significant y bit) of the first symbol of the block and the quadrant bits of the first symbol of the previous block. The first symbol is chosen for convenience but any other consistent choice would be satisfactory. This quadrant rotation is then applied to all symbols of the block being transmitted.

This means that the quadrant bits of the first symbol becomes zero; these are not transmitted: instead we substitute the difference.

After the decoder at the receiver the difference bits in the first symbol are differentially decoded. The difference bits are also used to apply the reverse rotation to all the symbols of the block and the differential decoder's output replaces the block's quadrant bits. A systematic quadrant phase error in the transmission path is thus cancelled since this affects equally both the phase of the received difference and the phase of the received symbols.

Figure 1:
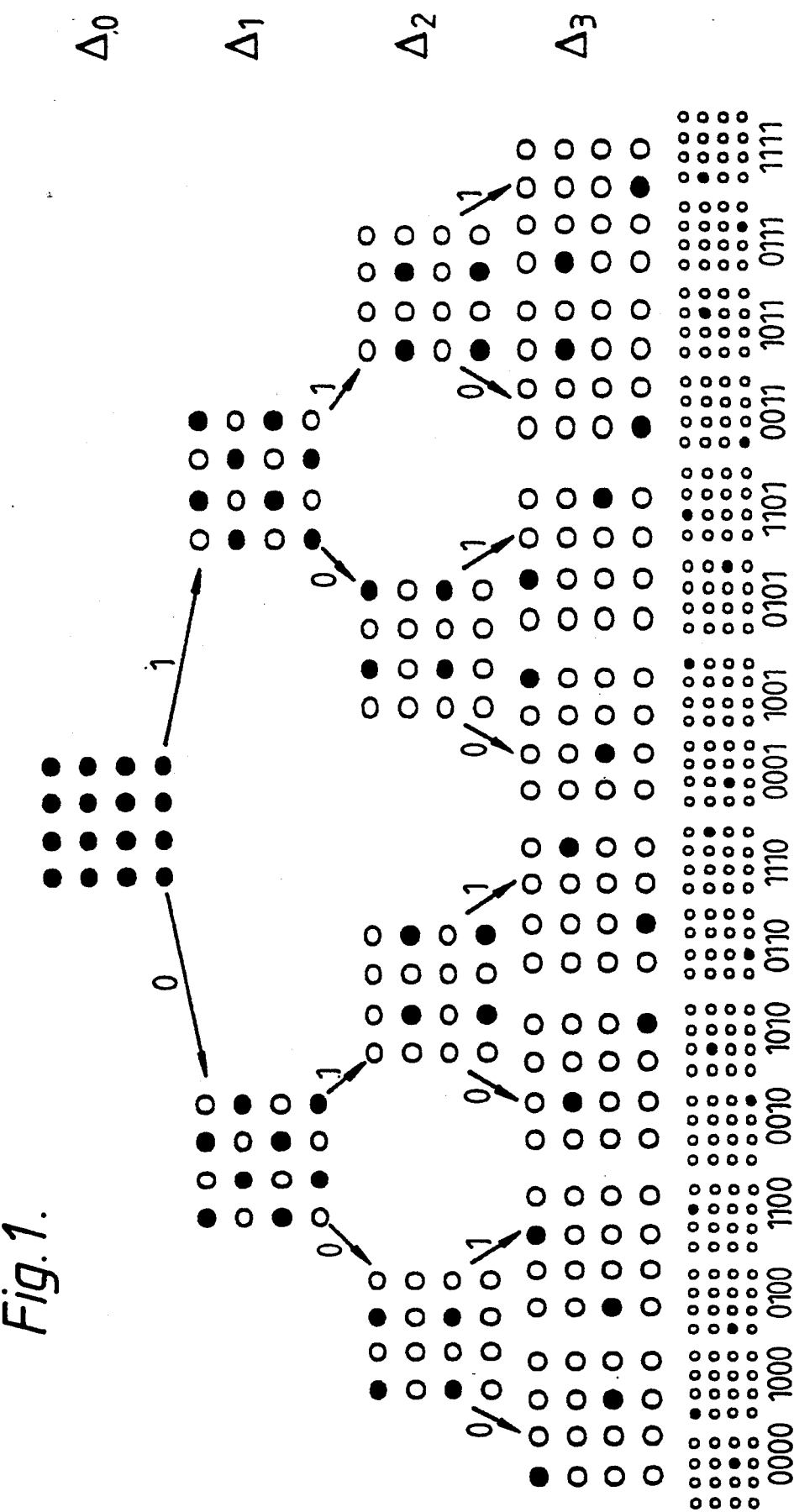
FIG. 1 is a phase diagram showing a known way of partitioning a 16 point QAM constellation.

Note that this procedure requires that the most significant bits of the first symbol also indicate the quadrant: this is true for the partioning of FIG. 1, but care needs to be taken if less systematic bit allocations—or constellations other than those having $2^n$ points in a square array—are used.

A coder and decoder implementing this procedure for the code of FIG. 9 are shown in FIG. 12. Items 2 to 6 of FIG. 10 are shown as an encoder 50. The most significant bits $a_{3,1}$ and $a_{3,17}$ of the first encoded symbol of the block are separated and supplied to a differential phase unit which takes the difference between its output one block previously (via a delay 52) and its input. Note that this unit does not take the differences between the bits, but provides an output indicating the phase difference (for example by means of a look-up table). All the bits are supplied to a rotator 53 which applies a phase shift of 0°, 90°, 180° or 270° as indicated by the output of the differential unit 51. This involves complementing the bits and/or transposing x and y values, thus:

| Phase (clockwise) | | |
| --- | --- | --- |
| 0° | x out = x in | y out = y in |
| 90° | x out = y in | y out = $\overline{\text{x in}}$ |
| 180° | x out = $\overline{\text{x in}}$ | y out = $\overline{\text{y in}}$ |
| 270° | x out = $\overline{\text{y in}}$ | y out = x in |

The differentially encoded quadrant bits of the first symbol are substituted for the quadrant bits of the output from the rotator. These are then fed to a modulator 54 which contains items 7 to 16 of FIG. 10.

After transmission over a link 55, the inputs are demodulated in a demodulator 56 containing units 20 to 26 of FIG. 11, and then pass to a decoder 57. This contains units 27 to 32 of FIG. 11; however the output that is required from the decoders 30, 32 is not the data bits but the bits deemed by the decoder to have been received by the transmitter—i.e. the auxiliary output 35 of FIG. 11.

The differentially encoded quadrant bits from the first symbols are supplied to a differential decoder comprising a one-block delay 58 and phase difference unit 59 (e.g. a look-up table similar to that used for the unit 51) to produce received bits (a'$_{3,1}$, a'$_{3,17}$); it also controls a rotator 60 which receives the remaining bits from the decoder 57 and applies (assuming no phase shift on the link 55) the opposite phase rotation to that applied in the transmitter rotator 53. In the event of a clockwise phase shift of n×90° on the link, the amount of rotation (anti clockwise) in the rotator 60 is, increased by n, thereby compensating for the n×90° clockwise rotation of the received symbols (other than the quadrant bits of the first symbol which are compensated by the differential coding).

The bits output from the units 59 and rotator 60 are now correct, and a relatively simple data extractor unit 61 derives the data bits from the Reed-Muller and Extended Hamming—coded bits and passes these, along with the uncoded bits, to an output 62.

This method of achieving 90° phase jump immunity has a number of implications for the codes used. Since the phase rotations introduced at the transmitter cannot be removed until after the soft-decision decoder 57, it is essential that the changes which these rotations make to the bits of the transmitted array are such that each coded row of the array remains a valid codeword—for example the changes made to the bits $a_{1,j}$ must not generate a codeword which the Reed-Muller code cannot produce.

The same phase rotation is applied to all bits except for the quadrant bits of the first symbol. Therefore it is necessary that (as here) these bits are derived from an uncoded row.

In the coded rows, in the case of the codes described in the Williams thesis referred to, the transposition of x and y places no constraint on the codes since the two coordinates are coded separately, whilst the fact that x or y may be complemented means that the code used must be such that if it contains a codeword A it also must contain its complement $\overline{A}$.

In the case of the present embodiment, two things may occur, viz, complementing x and y; or transposition of x and y and the complementing of one of them. The first situation is met by the constraint just mentioned. The second means that (given, as shown in FIG. 9 that the x coordinates are taken from the first half of the codeword and the y from the second), if BC is a valid codeword, where B and C are its two halves, then $C\overline{B}$ and $\overline{C}B$ are also valid codewords. Both the Reed-Muller and extended Hamming codes possess this property.

Figure 2:
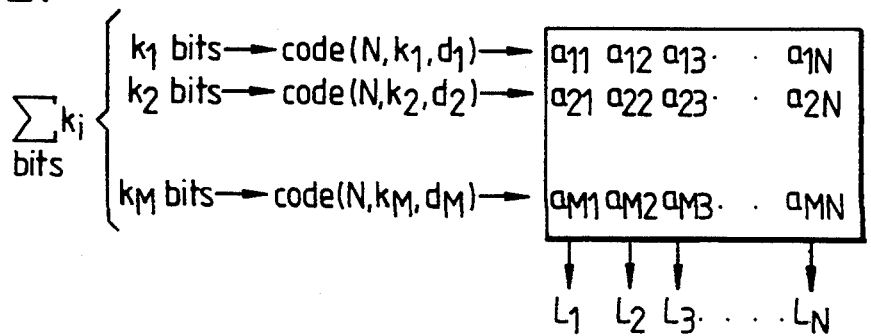
FIG. 2 illustrates by means of an array one known method of block coding.
Figure 2A:
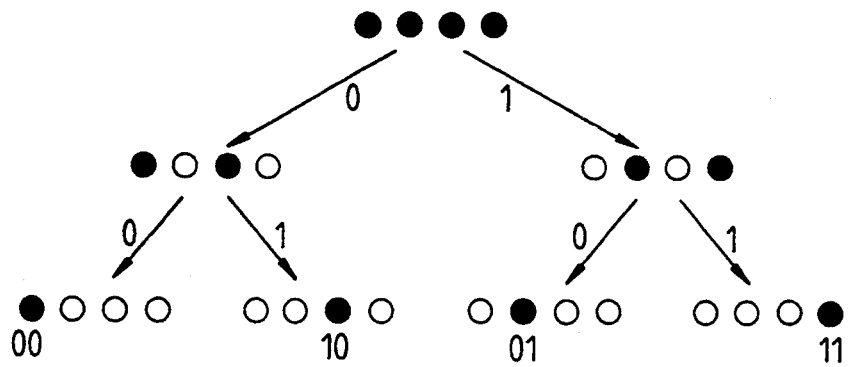
FIG. 2A is a diagram illustrating partitioning in one dimension.
Figure 3:
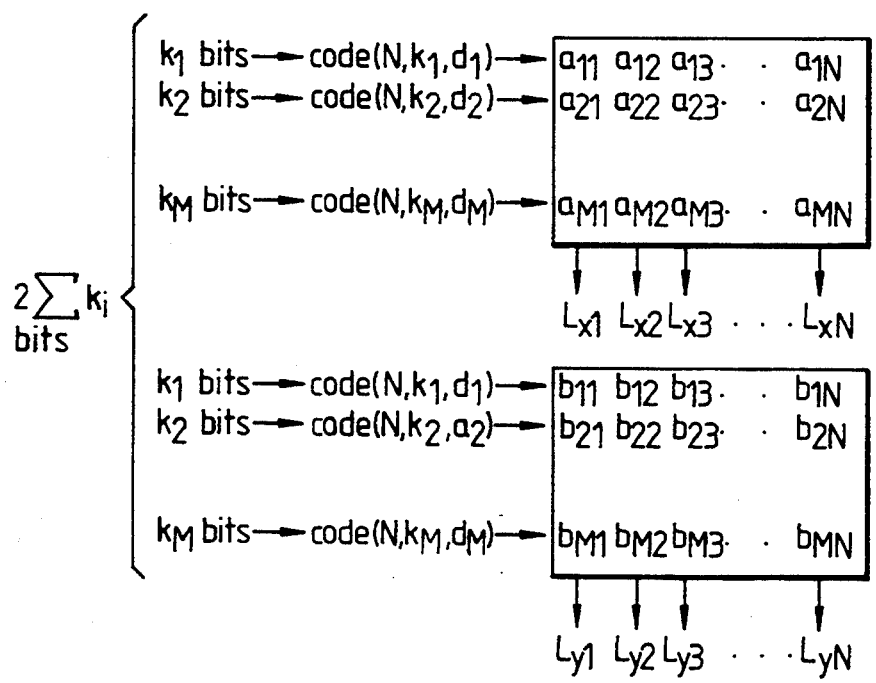
FIG. 3 illustrates in similar fashion a second known method of block coding.

The foregoing description of the coder and decoder has assumed that a coordinate (relative to the lower left point) and a point label are synonymous, though—as has already been pointed out in the discussion of FIG. 2A—this is not essential; but the only change that can occur to the coded bits is that one or more label bits are complemented relative to the coordinate bits. In the coder of FIG. 10, this simply requires that conversion of labels to coordinates needs to occur in the modulators 13, 14. In the decoder, the situation is slightly more complex. If the same partitioning is used in the x and y directions, so that relative complementing will occur on all bits of a given row of the codeword array, then the aforementioned constraint on the codes that A and $\overline{A}$ are both valid codewords will ensure that operation of the Reed-Muller and Extended Hamming Decoders will be unaffected. If different partitioning is used this will impose other constraint (e.g. that BC and $B\overline{C}$ are both valid codewords).

Assuming these constraints are met, then it is a simple matter to invert decoded bits output from FIG. 11.

It will be apparent that it is crucial to all methods of block coding that block synchronization be maintained. Initial synchronization can readily be achieved by conventional start-up-procedures, but provision needs to be made to recognize and rectify loss of synchronization. Any of the conventional block synchronization methods may be employed by the apparatus just described.

The method now to be described (which may also be used in other systems requiring block synchronization) involves the use, once per block, of an expanded signal constellation, having twice as many points (the additional points surrounding the 'normal' constellation). The bit assignments of the expanded constellation remain the same as for the normal constellation for those points which are common to both, whilst the added points in the larger constellation will have a '1' appended to their bit assignments. FIG. 13 shows, as well as a basic 64 point constellation such as might be used for the scheme of FIG. 9, 64 additional points. Point labels—shown as (x, y) coordinates in octal notation—referred to the corner of the basic constellation—are indicated; for the inner points these follow the same convention as in FIG. 1. FIG. 14 shows a similar 256+256 constellation (labelled using hexadecimal notation) for use with the 256—point modified FIG. 9 scheme referred to above.

The expanded constellation could in principle be used more than once per block but its use needs to be limited to a minority of the transmitted symbols if the mean power of the signal is not to be increased excessively.

The proposed method of block synchronization involves the use of the enlarged constellation for transmission of the one specified (e.g. the last) symbol of each block.

In the receiver, this fact is detected; if the receiver counts the number of symbols between 'last symbol' detections it can verify correct block synchronization by checking that this count is an integral multiple of the block length. If block synchronization is lost the receiver can wait until the next detection of two last symbol detections an integral multiple of block length apart and realign its block synchronization to these received symbols.

The expanded constellation can also serve to permit transmission of an extra bit per block—either for the provision of a secondary channel or to increase the main channel capacity (e.g. to increase the capacity of the 256 point modified FIG. 9 scheme from 111 to 112 bits per block). One symbol per block can be used in this way for both extra capacity and block synchronization, but a penalty is felt in block synchronization recovery time since, effectively, not all blocks will then carry a block synchronization marker.

The constraints on labelling of the additional points need to be mentioned.

(1) The constraints on the Euclidean significance need to be maintained. If—as suggested earlier—a constellation is used with two coded rows and two uncoded rows then the two least significant bits of the labels of the additional points need to follow the same pattern as the original points; thus in FIGS. 13 and 14 the least significant bit of each coordinate follows the pattern 0, 1, 0, 1, 0, 1, 0 etc across the whole diagram and the least significant but one has a pattern 0, 0, 1, 1, 0, 0, 1, 1 etc. It has already been mentioned that the two bits derived from uncoded groups can (as far as Euclidean distance considerations are concerned) be assigned arbitrarily to the two most significant bit positions of the label.

(2) The method described for achieving 90° phase-jump immunity assumes that the most significant bit of each coordinate indicates the quadrant occupied by the relevant point. If this is also true of the labelling of the outer points, then no difficulty arises; if—as in FIGS. 13 and 14—this is not the case then two consequences ensue; firstly, the expanded symbol must not be used in the first (or other) position carrying the rotation information, and secondly the rotators 53 and 60 would require a look-up table to effect the required rotation.

Figure 15:
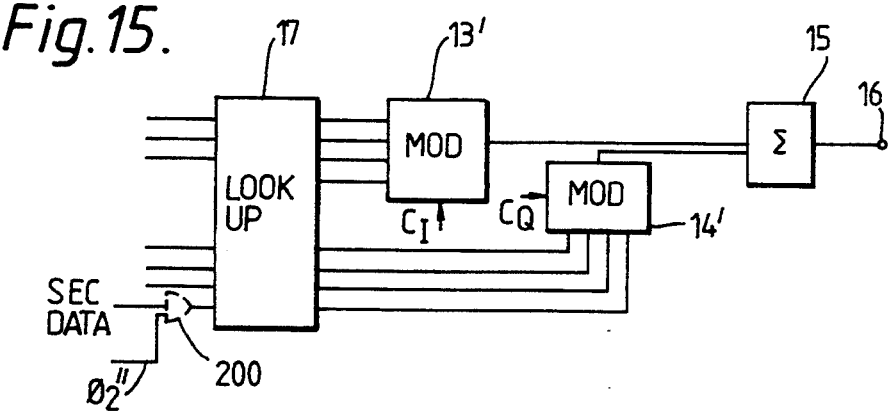
FIG. 15 is a block diagram of part of the coder of FIG. 10, modified to provided synchronization.

The proposed block synchronization method may be implemented for a basic 64-point constellation with 64 additional points using the circuit of FIG. 15 which replaces items 13 to 16 of FIG. 10. The x and y labels from the registers 7, 8, 9 and 10, 11, 12 are routed to the address inputs of a read-only memory 17 containing a look-up table: the data output of this feeds the inputs to the modulators 13', 14', which of course now each have four input bits. A seventh address line is supplied with a 150 Hz block synchronization signal $\phi_2''$ from the clock 3. This occurs (i.e. goes to "1") one symbol period earlier than the signal $\phi_2'$ and thus occurs during the last symbol of a block—as envisaged in the above discussion (though obviously it can be timed to occur at any desired block position).

The contents of the memory 17 are such that, when the synchronization signal $\phi_2''$ is inactive (="0") the data output is identical to the lower six address inputs, but when the signal $\phi_2''$ is high then the output is the label of that one of the 64 additional points of the constellation which has the same label as the inner point having the coordinates applied to the address input.

Figure 16:
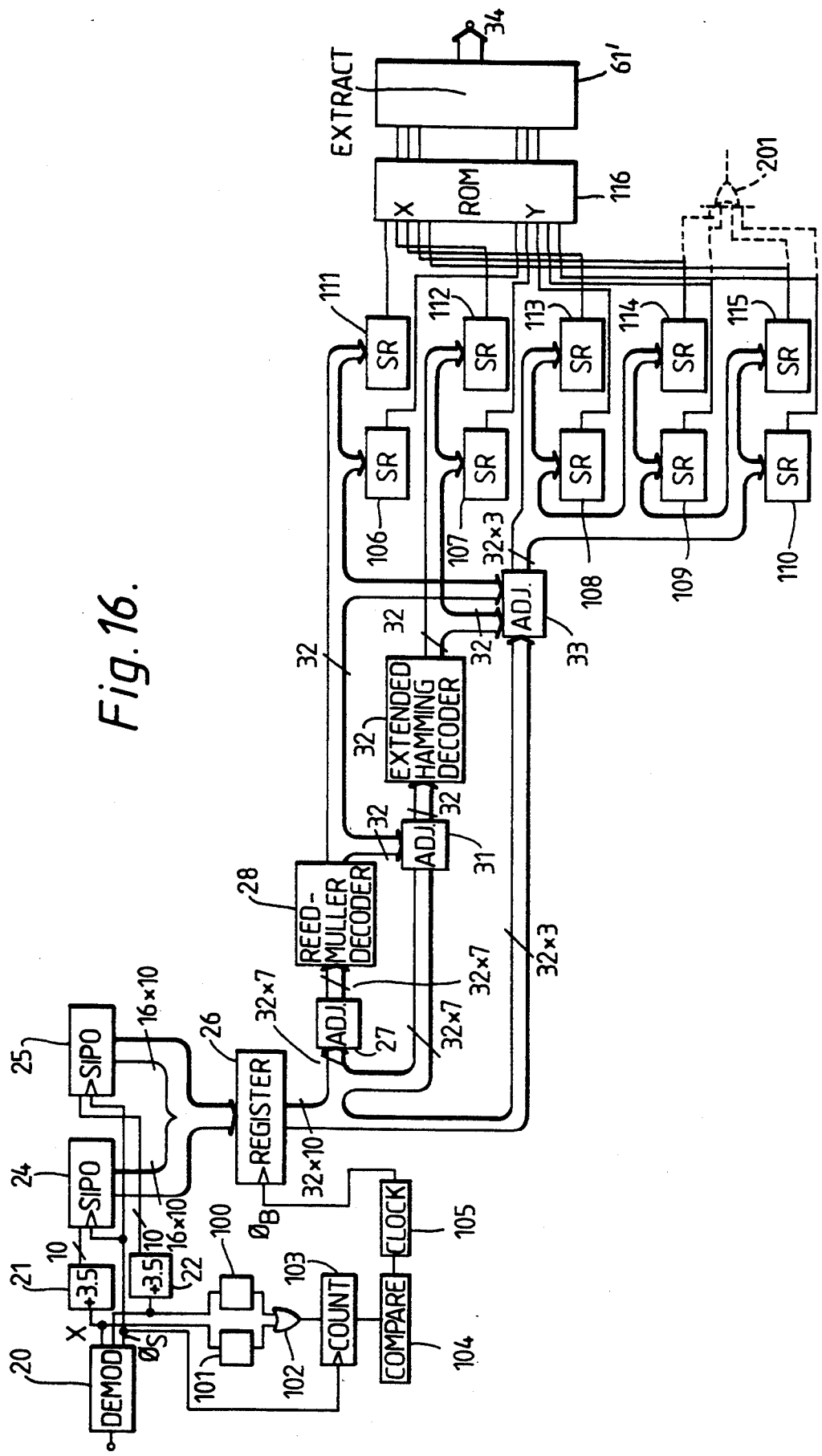
FIG. 16 is a block diagram of a modified form the of the decoder of FIG. 11, with synchronization circuitry added.

The decoder of FIG. 11 is redrawn in modified form in FIG. 16. In this version the (conventional) x and y coordinates output from the demodulator 20 are monitored by comparators 100, 101 whose outputs are combined in an or- gate 102, such that the latter produces an output whenever the modulus of either coordinate exceeds 4, indicating the presence of a synchronizing symbol. A counter 103 driven by the symbol clock $\phi_S$ counts the number of symbol periods between consecutive synchronizing symbols and a comparator 104 checks that this count is an integer multiple of the block length (16 in this example). If not, it produces an output to re-synchronize (if necessary) a block clock generator 105 which produces block synchronization pulses $\phi_B$.

Since, when the outer 64 points of the constellation are in use, the (shifted) coordinates output from the address 21 to 22 have a range from $-2$ to $+9$ and hence two additional lines are required—a sign bit and an extra (most significant) bit. In this embodiment two's complement representation is used, so that the least significant two bits of the coordinates correspond to the labels and no modification is needed to the decoder 28, 30. The two extra bits pass, like the original most significant bit, directly from the register 26 to the adjuster 33 and the 32-bit outputs from the decoders 28, 32 and the 96 bits from the adjuster 33, are converted into serial form by parallel-in/serial-out shift registers 106-115. Each pair of co-ordinates is then used as an address to access a read-only memory 116 which serves to convert the outer point coordinates into the corresponding labels which are then converted by an extractor 61' analogous to the extractor 101 of FIG. 12 into data to be output on an output 34.

In the event that the synchronizing symbol is to serve also for secondary channel data this is achieved in the coder by gating the block synchronizing pulses $\phi_2''$ in an and—gate 200 (shown dotted in FIG. 15). At the decoder the data are extracted by picking up the sign bit and (new) MSB for both coordinates of the last bit of the block from the output of the adjuster 33 and combining these in an or gate 201 (shown dotted in FIG. 16). The synchronization arrangements are unchanged since the counter 103 and comparator 104 are already arranged to cope with the absence of expected synchronizing symbols.

As mentioned above, this technique for synchronization is not limited to block coding but may also be used in other situations where block synchronization is required. For example in convolutional coding where the coding process does not have a block structure but block synchronization may be required for other reasons—e.g. data framing—modulation may be switched to use the outer points of an enlarged constellation at regular intervals corresponding to a desired block length.

Figure 17:
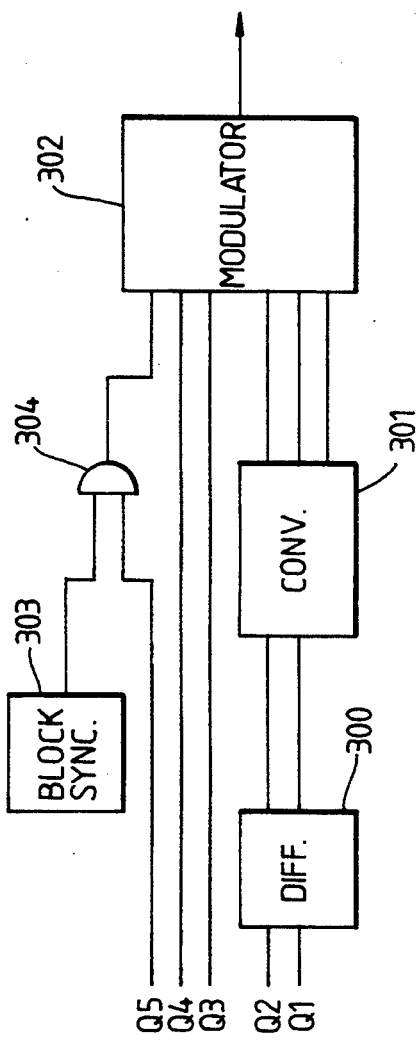
FIGS. 17 and 18 are block diagrams of, respectively a coder and decoder in accordance with a further embodiment of the invention.

FIG. 17 shows an embodiment employing convolutional coding. The coding used is a modification of the CCITT V. 32 standard. Data to be transmitted are received in groups of four bits Q1 . . . Q4, of which two bits Q1, Q2 are subject to modulo-4 differential coding in a differential coding unit 300, to produce difference bits Y1, Y2; these are processed by a convolutional coder 301 to produce an additional bit Y0. Bits Y0, Y1, Y2, Q3 and Q4 are supplied to a modulator 302. The modulator contains a look-up table or map relating bit combinations (labels) to phase/amplitude combinations and generates a QAM output symbol. In a first mode, these five bits are used to select a symbol from a $2^5=32$-point constellation; the bits Y0, Y1, Y2 serve to select between eight possible subsets and the bits Q3, Q4 serve to identify on point of the chosen subset. The description thus far is conventional. However the modulator 302 has a sixth input S5 supplied with a pulse from a block synchronizing generator 303, every p blocks, where p is some desired block length. The presence of a pulse at this input serves to switch the modulator into a second mode in which the output symbol is instead selected from a further 32 additional outer constellation points. The labelling is such that the subset selected by Y0, Y1, Y2 extends into this outer region in accordance with the partitioning approach discussed earlier. The pulses S5 can be gated (by an and gate 304) with an additional data input Q5 so that secondary channel data can be carried by the synchronizing symbol.

Figure 18:
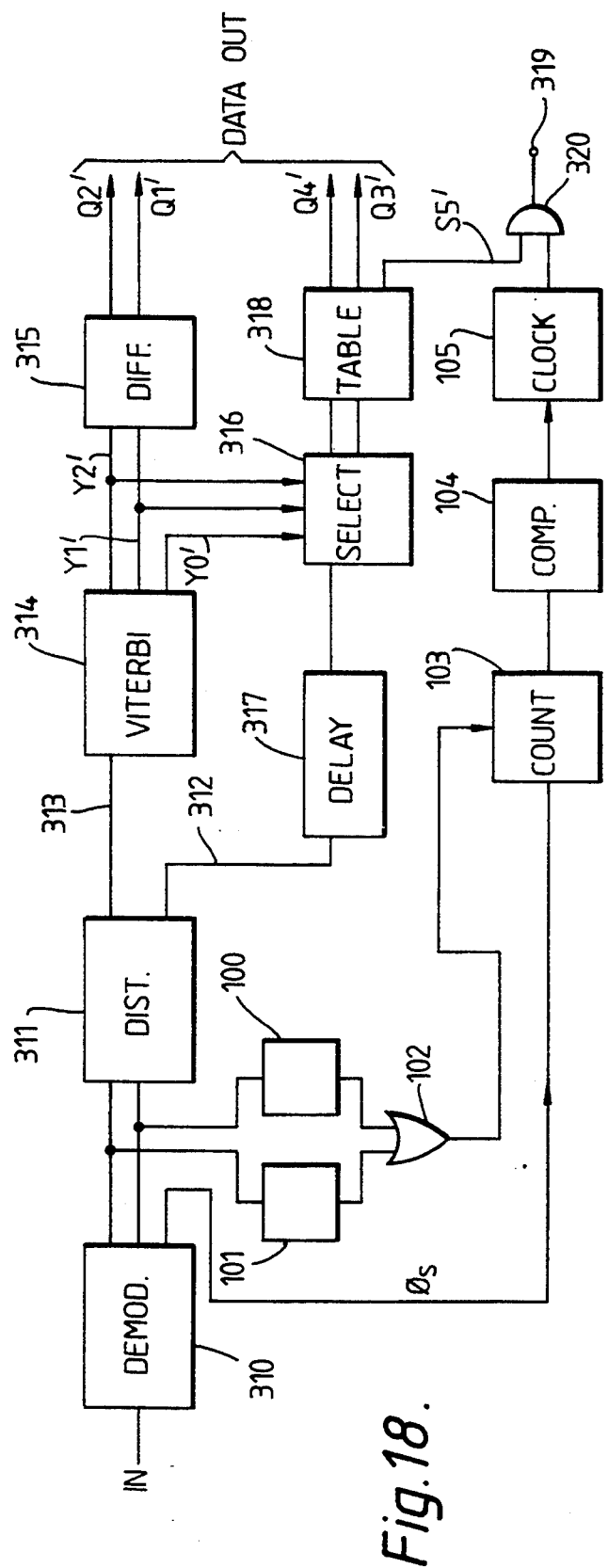

A decoder is shown in FIG. 18. Those parts whose function is substantially the same as for decoding of a signal from a conventional V. 32 modulator will first be described. A demodulator 310 produces, for each received symbol, x and y coordinates; it also generates a symbol clock $\phi_S$. A unit 311 receives each pair of coordinates and quantizes these to the eight possible subsets that can be chosen by the coder—i.e. it produces on an output 312 the coordinates of the eight points of the constellation (one in each subset) which are the closest to the coordinates of the received symbol. It also produces on an output 313 eight distance metrics, being the Euclidean distance of the received symbol from those eight points. These metrics are processed by a Viterbi decoder 314 to determine which subset is deemed to have been received, and outputs decoded bits Y0', Y1', Y2'. Bits Y1', Y2' are fed to a differential decoder 315 which reverses the differential coding of unit 300 and produces output bits Q1', Q2'. The three bits Y0', Y1', Y2' identify the subset in which the received symbol is deemed to lie and control a selector 316 to select the corresponding one of the eight pairs of coordinates from the line 312 (delayed in a unit 317 to allow for the Viterbi decoder delays); the selected coordinates are then applied to a look-up table 318 which derives decoded bits Q3', Q4' in accordance with the mapping of the latter performed by the modulator 301. The operation of the units 314, 315 is identical to that of a standard V. 32 decoder, whilst that of units 310, 311, 317, 316, 318 is similar except that they must accommodate the larger constellation; in particular the table 318 has an additional output for the synchronizing bit (S5'). Synchronizing of a block clock generator 105 is achieved by comparators 100, 101, OR gate 102, a counter 103 and a comparator 104 whose function is identical to that of the same components in FIG. 16. As the synchronizing bit S5' also carries secondary data this is routed to a data output 319 via an AND gate 320 fed from the clock 105; thus the block clock serves to prevent output of erroneous data on symbols other than the synchronizing symbol.

The clock output is also supplied to the unit 311 to limit the quantization to points of the inner constellation except on the synchronizing symbol.

Another situation in which these synchronizing provisions are of value is for changing data rate during transmission. Conventionally, if a first modem is transmitting to a second modem and it is proposed (either as a result of manual intervention or an automated function) that the data rate should be changed, then an escape code is transmitted and thus frees the channel to permit transmission of rate instructions.

In the present proposal synchronizing is provided in the manner described above, and a secondary channel is provided—either using the synchronizing symbol as suggested earlier, or by multiplexing the secondary channel with the data to be transmitted. Whether block or convolutional coding is used the synchronization signals serve to permit separation of the secondary channel bits at the receiving end.

This secondary channel is employed for the transmission of rate information. For example, suppose a first and a second modem are in duplex communication and a decision is made at the second modem that (for example due to changing reception conditions) that the first modem should increase its transmitting data rate, the second modem transmits to the first, via the secondary channel, a signal indicating this fact.

In the event that the first modem is to change its transmitting data rate—in response to such a request, or upon manual intervention, or for some other reason—it transmits, on the secondary channel, a signal indicating the rate to which it will change and a signal indicating the time at which it will do so. The second modem, having decoded this information, is then able to switch its receiving circuits at the appropriate instant so that continuous reception occurs.

All the codes referred to in this description are well known; for further particulars, reference may be made to "The Theory of Error Correcting Codes", F. J. McWilliams & N. J. A. Sloane, North Holland Publishing Co. 1978.

We claim:

1. An apparatus for modulating digital signals onto a carrier, comprising:
   means for receiving a block of bits to be transmitted;
   coding and partition means responsive to the means for receiving for partitioning each block into groups of bits, at least one group having been coded by a single redundant code having a Hamming distance greater than one, the partitioning and coding being such that each group has the same number of bits;
   means for assembling a plurality of digital words from the bits output by said coding and partition means;
   means responsive to the means for assembling for quadrature amplitude modulation of said carrier to form a plurality of successive output symbols each having two quadrature components, the two quadrature components of each symbol being determined by a respective pair of the digital words;
   wherein in said means for assembling each of said digital words contains one bit from each of said groups, so that at least one said group coded by said single redundant code produces bits which are applied by said quadrature amplitude modulation means to determine a first quadrature component of each symbol and produces bits which are applied by said quadrature amplitude modulation means to determine a second quadrature component of each symbol.

2. An apparatus according to claim 1, wherein, in the coding and partitioning means, at least one group either is uncoded or is coded using a code having a smaller Hamming distance than the redundant code, and the modulation means is so arranged that each bit supplied thereto as part of a pair of digital words which bit is derived from the redundant code produces a minimum Euclidean distance which is greater than that produced by any bit derived from the one group.

3. An apparatus according to claim 1 wherein at least one coded group is coded employing a code which has a Hamming distance greater than that obtainable by dividing the group into two subgroups and coding each subgroup independently into the same total number of bits.

4. An apparatus according to claim 3 including means to examine bits determining a predetermined symbol of a block and those of a predetermined symbol of a preceding block to determine an angular difference between quadrants occupied by those symbols; and means responsive to said angular difference for rotating the phase of the transmitted symbols of the block in question by the angular difference, said quadrature amplitude modulation means being responsive to said angular difference for modulating the carrier with information representing the angular difference.

5. An apparatus according to claim 1 including means to examine bits determining a predetermined symbol of a block and those of a predetermined symbol of a preceding block to determine an angular difference between quadrants occupied by those symbols; and means responsive to said angular difference for rotating the phase of the transmitted symbols of the block in question by the said angular difference, said quadrature amplitude modulation means being responsive to said angular difference for modulating the carrier with information representing the angular difference.

6. An apparatus according to claim 5 in which that one of the pairs of digital words which determines the predetermined symbol contains two bits which are derived from a group which is not coded and which alone define the phase quadrant in which the symbol lies, and the means for modulating the carrier with information representing the angular difference is operable to transmit two bits representing the angular difference in lieu of the two quadrant-defining bits of the predetermined symbol.

7. An apparatus according to claims 2, 3, 5, 6 or 4 including block timing means operable to produce a block synchronization signal during a predetermined symbol period of the block, the quadrature amplitude modulation means being responsive to receipt of the synchronization signal to produce a modulated carrier of greater amplitude than it can produce in the absence of such receipt.

8. An apparatus according to claims 1, 2, 3, 5 or 6, in which the number of bits in each group is odd, and including means for storing, upon processing a first block of a pair of blocks, one of the digital words, and for supplying, during processing of the second block of a pair, the stored word to the quadrature amplitude modulation means, such second blocks containing a number of symbols one greater than such first blocks.

9. An apparatus according to claim 8 including block timing means operable to produce a block synchronization signal during a predetermined symbol period of the block, the quadrature amplitude modulation means being responsive to receipt of the synchronization signal to produce a modulated carrier of greater amplitude than it can produce in the absence of such receipt.

10. An apparatus according to claim 1 including block timing means operable to produce a block synchronization signal during a predetermined symbol period of the block, the quadrature amplitude modulation means being responsive to receipt of the synchronization signal to produce a modulated carrier of greater amplitude than it can produce in the absence of such receipt.

11. An apparatus according to claim 10 including gating means responsive to the means for producing the block synchronization signal for controlling receipt or non-receipt of the block synchronization signal by the quadrature amplitude modulator means, so that additional information may be transmitted for each of said blocks.

12. An apparatus according to claim 11, operable at two or more different data rates, comprising control means operable in response to a signal representing a request for a change of rate:
(a) firstly, for generating during transmission of said additional information, signals identifying a data rate to which it is about to change and the time at which it is to occur; and
(b) at the identified time, changing to transmission at the identified rate.

13. An apparatus according to claim 10 including time division multiplex means, synchronized to the block timing means, for combining data input to the apparatus and additional information to produce the block of bits to be transmitted.

14. An apparatus according to claim 13, operable at two or more different data rates, comprising control means operable in response to a signal representing a request for a change of rate:
(a) firstly, for generating during transmission of said additional information, signals identifying a data rate to which it is about to change and the time at which it is to occur; and
(b) at the identified time, changing to transmission at the identified rate.

15. An apparatus for demodulating digital signals modulated on a carrier using the apparatus of claim 1, comprising:
a demodulator for receiving a block of symbols and producing coordinate values representing the two quadrature components thereof,
means for assembling, for each block, groups of bits, each group containing one bit from each said coordinate value;
and decoding means arranged to decode the groups, said decoding means including at least one decoder for decoding a group in accordance with said single redundant code having a Hamming distance greater than one.

* * * * *